Patented July 9, 1940

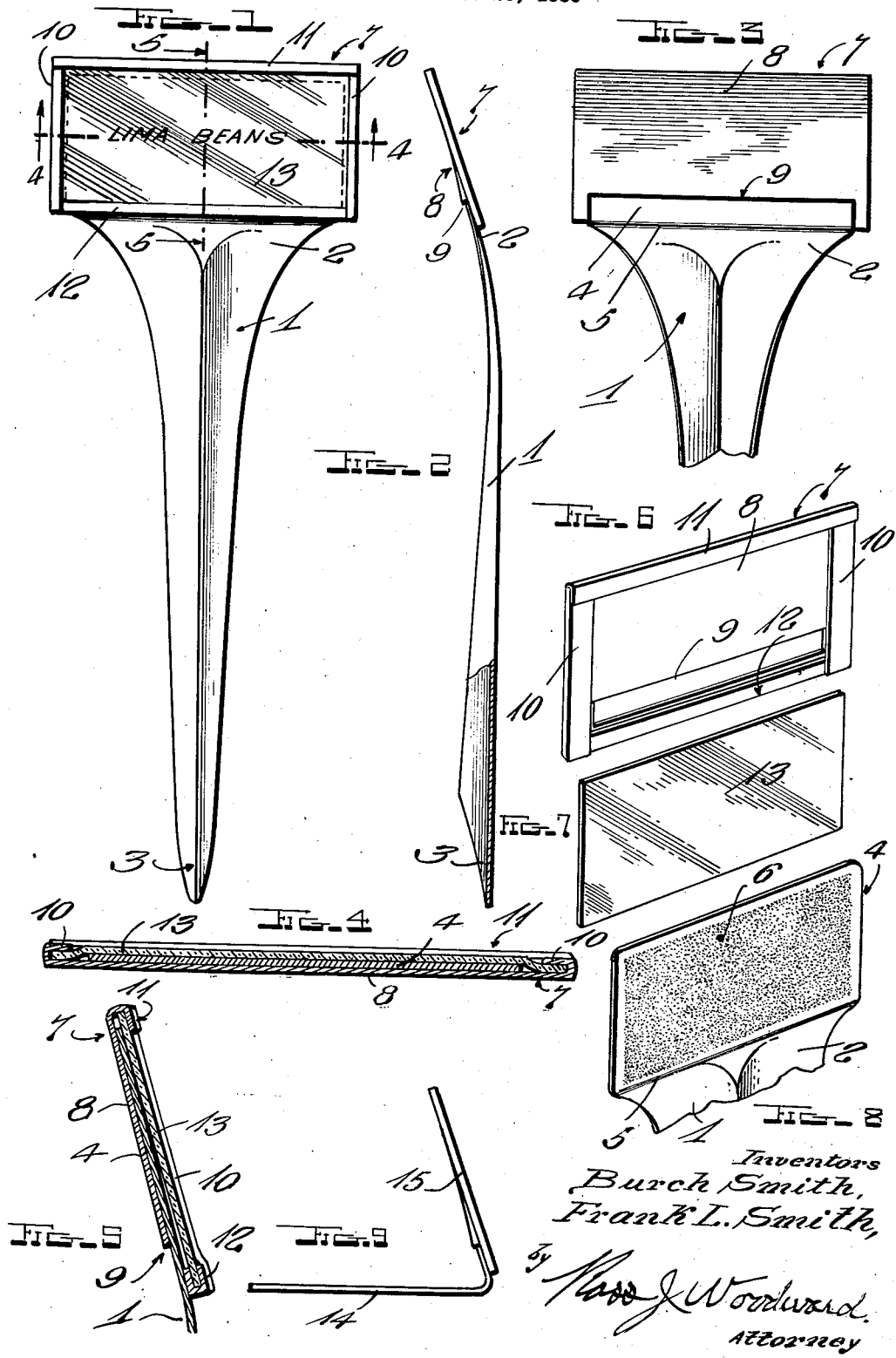

2,207,180

UNITED STATES PATENT OFFICE 2,207,180

PLANT MARKER

Burch Smith and Frank L. Smith, Xenia, Ohio

Application December 26, 1939, Serial No. 311,037

4 Claims. (Cl. 40—10)

This invention relates to plant markers and it is one object of the invention to provide a device of this character of such construction that it can be easily thrust into the ground and serve very effectively as means for identifying a plant or bed of flowers with which it is associated.

Another object of the invention is to provide a marker having a shank adapted to be easily thrust into the ground and a head or cross board at the upper end of the shank disposed at such an angle that the name of the plant or the flowers upon the cross head can be easily read.

Another object of the invention is to provide a plant marker having its head or cross board so formed that a name can be easily written thereon and, in addition, provide a frame for enclosing the cross board and shielding the same from dirt or water, said shield having a panel of Cellophane, glass, or other transparent material through which the name written upon the cross board may be seen and read.

Another object of the invention is to so form the shield that it may be very easily applied to the cross board and, when in place, be self retaining and so associated with the board that water running downwardly along the shield or the under face of the board will be prevented from reaching the upper face of the board upon which the name of the plant is written.

Another object of the invention is to provide a plant marker formed of sheet metal and having its shank of such formation that it can be easily thrust into the ground and will not be liable to be bent transversely.

The invention is illustrated in the accompanying drawing, wherein:

Fig. 1 is a front elevation of the improved plant marker.

Fig. 2 is a side elevation of the plant marker.

Fig. 3 is a rear elevation thereof with the lower portion of the shank or stake broken off.

Fig. 4 is a sectional view taken transversely through the head of the marker, on the line 4—4 of Fig. 1.

Fig. 5 is a vertical sectional view on the line 5—5 of Fig. 1.

Fig. 6 is a perspective view of the shield for the cross head or sign board of the marker.

Fig. 7 is a perspective view of the transparent sheet carried by the shield.

Fig. 8 is a perspective view of the head board.

Fig. 9 is a side elevation of a modified form of the device intended for use on a counter as a price tag holder.

This improved plant marker is formed of sheet metal and has a shank or stake 1 which tapers downwardly from its wide upper end 2 and is crimped transversely, as shown in Figs. 2 and 3, so that it will be substantially V-shaped in cross section. This imparts added strength to the shank and braces it against transverse strains which would be liable to bend the shank while thrusting it into the ground and, in addition, provides the shank with angularly disposed side portions which may have their lower end portions cut off diagonally to form a sharp lower end 3 adapted to be easily thrust into the ground when setting the marker or sign in place. A cross head or sign board 4 is formed integral with the wide upper end of the stake and it should be noted that the upper portion of the stake is curved rearwardly, as shown in Fig. 2, and the sign board bent rearwardly along the line 5 to dispose the sign board at a rearward incline in such position that the name of a plant or flower may be easily seen and read when looking downwardly at the marker while standing near a flower bed. By having the upper portion of the stake curved longitudinally, the cross head or sign board may be grasped with a thumb and finger gripping the upper portion of the stake and the stake easily forced into the ground. The entire head board and the shank are either formed of aluminum or coated therewith to prevent rust or corrosion thereof and the front face of the sign board or head board is painted to form a "blackboard" finish 6 which is white or some other light color and somewhat rough so that the names of plants or flowers may be written thereon with a pencil or pen, or stamped or otherwise imposed upon the sign board.

In order to protect the marker and prevent the name written or otherwise applied to the front face of the sign board from being obliterated by spattered dirt and water during rainy weather or when watering the garden with a hose, there has been provided a shield 7 which is also formed of sheet metal which may be aluminum or coated with aluminum paint to prevent rust. This shield has a back wall or plate 8 formed adjacent its lower edge with a transversely extending slot 9 of such length that the sign board 4 may be thrust upwardly through the slot into the shield, as shown in Figs. 4 and 5. Extensions project from ends and upper and lower sides of the back plate and these extensions or tongues are bent forwardly and inwardly to form end flanges 10 and upper and lower flanges 11 and 12. Therefore, the shield constitutes an open frame in which a closure sheet 13 is mounted and firmly held in place by the flanges which grip marginal portions thereof. The closure sheet may be glass but it is preferably transparent plastic material such as Cellophane or the like which is waterproof. The name written upon the sign board can be clearly seen through the transparent sheet and since ends of the upper flange 11 overlap upper ends of the end flanges 10, water cannot enter the shield between ends of these flanges. It should also be noted that when the sign board is thrust upwardly into the shield through the slot 9, the lower margin of the shield rests against the lower marginal portion of the front face of the sign board and it will be impossible for water to drain into the shield and soil the front face of the sign board.

When the marker is in use, the shield is grasped in one hand and the shank 1 in the other hand, pulling force being then exerted to withdraw the sign board from the shield. The name of the plant or flower is then written or stamped upon the front face of the sign board and the sign board then thrust inwardly through the slot 9 into the shield which protects the sign board from dirt and water but permits the name applied to the sign board to be clearly seen through the transparent sheet 13. The device is then grasped at its top and the shank or stake thrust downwardly into the ground a sufficient distance to hold it firmly in place with the head or sign board disposed at such an angle that the name can be clearly seen and read.

While it has been stated that the device is for use as a plant marker, it will be understood that it may be used as a frame for price tags, advertising signs, or the like, in stores. Such a device is illustrated in Fig. 9, where the shank is bent to form a horizontally extending base 14. The base 14 will be flat so that it can rest upon a counter or the bottom of a shoe case and support the frame 15 in an upright but rearwardly inclined position. The flat base may be of any width found necessary to maintain the sign in upright position and it will be understood that in this embodiment of the invention the shield is removably held upon the sign board in the same manner previously described.

It should also be noted that by providing the marker with a shank having openings formed therein nails may be passed through the openings and driven into the trunk of a tree, thus securely holding the marker against a tree which it is desired to identify.

Having thus described the invention, what is claimed is:

1. A device of the character described comprising a sign board having a front face adapted to have indicia marked thereon, a support for said board, and a shield for said board consisting of a frame having a back plate and flanges along sides and ends of the back plate, said plate having a horizontal slot adjacent its lower side edge and through which the sign board is thrust into the frame in front of the back plate, and a sheet of transparent material having its marginal portions overlapped and gripped by said flanges to firmly hold the sheet in place in position to cover and protect the front face of the sign board.

2. A device of the character described comprising a sign board having a front face adapted to have indicia marked thereon, a support for said board, and a shield for said board consisting of a frame open at its front and having a back formed with a slot of a width adapting the sign board to be engaged through the slot and allowing the shield to be slid downwardly into place about the sign board, and a sheet of transparent material carried by said frame in closing relation to the front thereof, said sheet being formed of waterproof material and adapted to protect but at the same time disclose indicia provided upon the front face of the sign board.

3. A device of the character described comprising a sign board having a front face adapted to have indicia marked thereon, a support for said board, and a shield for said board consisting of a frame having a back plate and flanges along sides and ends of the back plate, said plate having a horizontal slot adjacent its lower side edge of a length adapting the sign board to be thrust upwardly into the shield, the upper side flange having its ends overlapping upper ends of the end flanges and the end flanges having their lower ends overlapping ends of the lower side flange, and a sheet of transparent material in said frame having its marginal portions overlapped and gripped by said flanges to firmly hold the sheet in place in position to cover and protect the front face of the sign board and indicia thereon.

4. In a device of the character described, a sign board having a supporting extension, and a shield for said board consisting of a frame having a back and flanges along sides and ends of the back, said back having a horizontal slot spaced from one of said sides and through which the sign board is thrust into the frame in front of the back, and a sheet of transparent material having marginal portions overlapped and gripped by said flanges to hold the sheet in place in position to cover and protect the sign board.

BURCH SMITH.
FRANK L. SMITH.